United States Patent [19]

Froome

[11] Patent Number: 4,786,176
[45] Date of Patent: Nov. 22, 1988

[54] METROLOGICAL APPARATUS AND METHOD USING POLARIZATION MODULATION

[75] Inventor: Keith D. Froome, Hampton, Great Britain

[73] Assignee: Rank Taylor Hobson Limited, Great Britain

[21] Appl. No.: 895

[22] Filed: Jan. 6, 1987

[30] Foreign Application Priority Data

Jan. 6, 1986 [GB] United Kingdom ............... 8600202
Feb. 22, 1986 [GB] United Kingdom ............... 8604427

[51] Int. Cl.⁴ .................... G01B 11/14; G01C 3/00
[52] U.S. Cl. ................................. 356/373; 356/5
[58] Field of Search ............... 356/5, 364, 366, 367, 356/368, 373; 250/225

[56] References Cited

U.S. PATENT DOCUMENTS 3,521,956  7/1970  Froome et al. .................. 356/5
3,547,539 12/1970  Froome et al. .................. 356/5

FOREIGN PATENT DOCUMENTS

760620  6/1967  Canada ......................... 356/5
596559 10/1977  Switzerland .................... 356/5
732360  6/1955  United Kingdom ................ 356/5

*Primary Examiner*—Davis L. Willis
*Assistant Examiner*—Matthew W. Koren
*Attorney, Agent, or Firm*—Lerner, David, Littenberg, Krumholz & Mentlik

[57] ABSTRACT

To measure distances, light from a flash tube is plane polarized by a polarizing filter, then polarization modulated by an electro-optical crystal, then passed along a 'wobbling' light path, then subjected to a relative retardation of about a quarter wavelength by a rhomb and then passed through a calibrated variable light path before being projected to a distant target reflector. The reflected light returns along the same path and is detected by a photomultiplier after passing through the polarizing filter. Adjustment of the variable light path until a null is obtained at the photomultiplier indicates that the length travelled by the light from the crystal to the reflector and back is an integral number of modulation wavelengths, possibly plus one half-wavelength. The quality of the null is adjustable by adjusting the orientation of the rhomb. Temperature correction may be provided by constructing a reference resonator defining the modulation wavelength of the same material as a structure being measured.

21 Claims, 4 Drawing Sheets

METROLOGICAL APPARATUS AND METHOD USING POLARIZATION MODULATION

BACKGROUND OF THE INVENTION

This invention relates to a metrological apparatus and to a metrogical method using polarisation modulation of a beam of radiation.

In particular a first and third aspect of the invention relates to a metrological apparatus comprising:

means for projecting a beam of polarised radiation such that the beam can be returned back along substantially the same path;

means for modulating the polarisation of the projected and returned portions of the beam; and means for detecting the returned portion of the beam after modulation.

Furthermore a second and a fourth aspect of the invention relate to a corresponding metrological method comprising steps of:

projecting a beam of polarised radiation;

returning the polarised beam along substantially the same path;

modulating the polarisation of the projected and returned portions of the beam; and detecting the returned portion of the beam after modulating.

Such an apparatus and method are known from United Kingdom patent specification No. GB 1172668. In the arrangement described in that specification the beam is polarised by a first polarising filter and is then modulated by at least one electro-optical crystal. The returned portion of the beam is modulated by at least one further such crystal having its crystal structure having its x and y axes oriented perpendicularly to those of the first crystal and is then filtered by a second polarising filter having its polarising direction crossed with that of the first filter.

It will be appreciated that, with matched crystals correctly oriented, with the polarising filters correctly oriented and with no stray polarising effects or natural birefringence of the crystals, no radiation will pass through the second polarising filter when the distance along the optical path from the first crystal to the second crystal is an integral number of modulation wavelengths. However, setting up the arrangement to perform perfectly is difficult if not impossible.

A fifth aspect of the present invention is concerned with a metrological apparatus comprising:

means for projecting a beam of radiation such that the beam can be returned to the apparatus;

means for varying the length of the path travelled by the beam;

means for detecting a characteristic of the returned portion of the beam which varies with the length of the path travelled by the beam; and means for determining when the rate of change of the detected characteristic with respect to the length of the path is substantially zero.

Furthermore, a sixth aspect of the present invention relates to a corresponding metrological method.

Such an apparatus and method are also known from United Kingdom Patent specification No. GB 1172668. In the arrangement described in that specification, the intensity of light passing through a polarising filter is detected, and steps are taken to determine when the detected intensity is a null.

A seventh aspect of the invention is concerned with a metrological method comprising the steps of:

projecting a beam of radiation from a first portion of a structure to a second portion of the structure;

modulating the beam at a modulation wavelength defined with respect to a reference wavelength;

detecting the beam after it has reached the second portion of the structure; and determining the distance between the first and second portions using the result of the detection step;

SUMMARY OF THE INVENTION

In accordance with the first aspect of the invention, the apparatus is characterised by means for introducing a phase shift in the beam so that, at zero modulation, the directions of polarisation of the projected and returned portions of the beam are crossed.

In accordance with the second aspect of the invention, the method is characterised by the step of introducing a phase shift in the beam so that, at zero modulation, the directions of polarisation of the projected and returned portions of the beam are crossed.

By introducing such a phase shift it is possible to use a single modulating means to modulate the polarisation of both the projected portion and the returned portion of the beam. Thus, there is no need to use a matched pair of crystals nor to ensure the correct relative orientation of two crystals.

In the case where a polarisation filtering means is used to polarise the projected portion of the beam, a further advantage of introducing such a shift is that the same polarisation filter means can be used to filter the returned portion of the beam. Thus, the need for two filters is obviated, as too is the need to ensure the correct relative orientation of two such filters.

Preferably, the phase shift means includes an element arranged to cause a relative phase shift in the outgoing beam portion and to cause a further phase shift in the returned beam portion. In the case where there is little natural birefringence of the modulating means and any other stray polarising effects are small, the phase shift produced by the phase shift element is preferably arranged to cause a relative retardation of generally a quarter of a wavelength in each portion of the beam. However, in the case where a significant relative retardation is caused by natural birefringence of the modulating means or by other elements of the apparatus, the total phase shift produced by the phase shift element is preferably arranged to cause a total relative retardation of half a wavelength caused by the remainder of the apparatus. Conveniently, the phase shift element may be a rhomb, which will produce a satisfactory effect when white light is used as the radiation. In the case where laser light is used, the phase shift element may conveniently be a retardation plate. Preferably, the degree of phase shift caused by the phase shift element is adjustable. In the case where a rhomb is used as the phase shift element, the adjustment means may comprise means for mounting the rhomb for movement relative to beam.

The phase shift element may be disposed before the modulating means relative to the direction of the projected beam portion. This arrangement is preferred when the modulating means is provided by a z-cut crystal of, for example, the 3 m or 4 bar 2 m type exhibiting the linear or Pockels electro-optical effect such as potassium dihydrogen phosphate or lithium niobate or dithium tantalate. A particularly advantageous effect of such an arrangement is that the projected beam portion entering the crystal will be generally circularly polarised, and so it is unnecessary to align a direction of polarisation with the crystal structure. A z-cut crystal implies that the radiation is directed along the z-axis of the crystal. Alternatively, the phase shift means may be disposed after the modulating means relative to the direction of the projected beam portion. This is preferred when the modulating means is provided by a x- or y-cut crystal of, for example, lithium tantalate. However, this arrangement may also be used with the z-cut crystals previously mentioned, particularly potassium dihydrogen phosphate.

The apparatus may further comprise a reflector means to reflect the projected beam portion to provide the returned beam portion, and in this case the phase shift means and the reflector means may together form a unit.

In accordance with the third aspect of the invention, the apparatus is characterised by phase shift means for introducing an adjustable unmodulated relative phase shift in the beam. A corresponding metrological method according to the fourth aspect of the invention is characterised by the step of introducing an adjustable unmodulated relative phase shift in the beam. Thus, compensation can be made for any undesirable polarising effects caused by the modulating means or the other optical elements of the system.

The phase shift means may comprise a rhomb and means to adjust the rhomb about an axis perpendicular to the plane of the rhomb, so as to adjust the phase shift provided by the rhomb. Means may also be provided to adjust tilting of the rhomb about at least one axis in the plane of the rhomb, in order to orient the principal axes of the rhomb and of the modulating means correctly. Alternatively, especially in the case where the radiation is laser light, or additionally, the phase shift means may comprise a retardation plate and means to adjust the plate about an axis perpendicular to the plane of the plate in order to adjust the phase shift which is provided.

The fifth and sixth aspects of the invention are concerned with increasing the accuracy with which a null can be detected. The fifth aspect of the present invention is characterised in that means are provided for introducing an alternating variation into the beam; and in that the determining means comprises means for determining when the detected characteristic is substantially equal for the alternate variations. Thus, rather than simply detecting a null, it can be determined when the intensities to either side of the null are equal, in order to achieve greater accuracy.

The metrological method according the sixth aspect of the invention is characterised by the corresponding steps of introducing an alternating variation into the beam and determining the zero rate of change by determining when the detected characteristic is substantially equal for the alternate variations.

The alternating variations may be provided by alternating the length of the path travelled by the beam, for example by vibrating an element disposed in the beam path. Additionally or alternatively, the time taken for the beam to travel along the path may be alternated, for example by alternatively disposing in and removing from the beam path an element which reduces the velocity of the beam. Additionally or alternatively, a characteristic of the beam may be alternately varied. For example, in the case where the beam is modulated, the alternating means may be operable to alternate the modulation frequency.

A method of the seventh aspect of the invention characterised by the steps of:

defining the reference wavelength by a means having a coefficient of thermal expansion substantially equal to that of the structure; and adjusting the temperature of the wavelength defining means to be substantially equal to that of the structure.

Thus, the wavelength defining means can be calibrated at a reference temperature, and the method will be self-correcting in order to provide a measurement of the structure at the reference temperature.

Specific embodiments of the invention will now be described by way of example with reference to the accompanying drawings.

DESCRIPTION OF THE EMBODIMENTS

Figure 1:
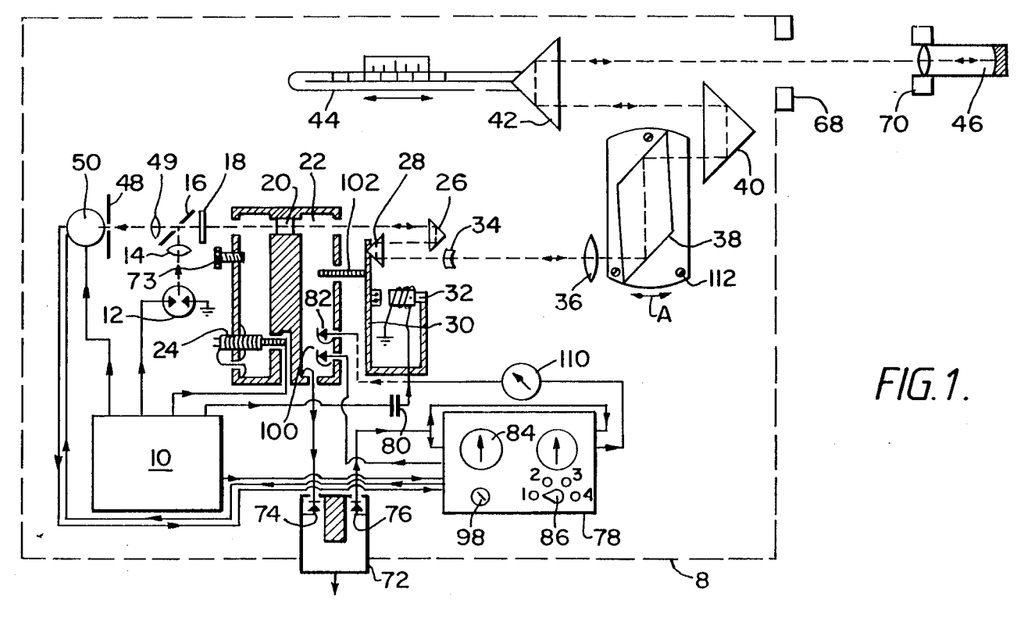
FIG. 1 is a diagrammatic representation of one embodiment of metrological apparatus according to the present invention.

Firstly, the construction of the optical arrangement of an embodiment of the invention will be described. Referring to FIG. 1, the apparatus comprises a main unit 8 and a distant reflector 46. In the main unit 8, a xenon flash-tube 12 produces high-intensity pulses of white light. This light is collimated by a convex lens 14 and then reflected by a mirror 16 through a plane polariser 18 and onto a Pockels crystal 20 mounted as shown in a modulating cavity resonator 22. The crystal 20 may be mounted in the resonator for tilting adjustment and the resonator may be rotatably adjustable about its longitudinal axis, so that the axes of the crystal structure may be aligned with the remainder of the apparatus. The light emerges from the crystal 22 and enters an internally reflecting (Porro) prism 26, and thence onto a second Porro prism 28 mounted on a spring 30 and driven by an electro-magnet 32. The light from the prism 28 enters a short-focus negative lens 34 which acts to fill the transmitting objective 36 with light. The light from the objective 36 enters a glass totally internally reflecting (TIR) rhomb 38. The transmitted light emerging from the rhomb 38 traverses a variable length light path (VLP) consisting of a fixed Porro prism 40 and a Porro prism 42 mounted upon a movable scale 44. This movement can be measured by means of the vernier shown or by means of a conventional or digital micrometer. The light then leaves the main unit 8 to fall upon the distant target-reflector 46. The reflector 46 is preferably of the 'cat's eye' type embodying a front-silvered concave reflector placed at the focus of a convex lens, the radius of the reflector being equal to the focus of this lens. The main unit 8 and the reflector 46 have complementary reference surfaces 68, 70, respectively. From the reflector 46, the light returns through the system back along its original path, and passes through a hole is the reflector 16. The light is then focussed by a lens 49 onto a pin-hole stop 48 to minimise daylight leak-through, and falls upon a photo-detector 50, preferably a photo-multiplier. In FIG. 1, all of the deflections of the beam through a right angle are shown for convenience in the plane of the paper. In practice, to avoid the introduction of unwanted relative phase shifts, each deflection in one plane must be compensated for by corresponding deflection in an orthogonal plane, but this criterion is not difficult to satisfy.

The optical performance of the apparatus will now be described. The polarisation of the beam in the case of a perfect apparatus without any stray polarisation introduced by the optical components, without any natural birefringence of the crystal 20 and with, say 90° depth of modulation of the crystal is as follows. The light leaving the flash tube 12 is unpolarised, but after passing through the polariser 18 is plane polarised. The crystal 20 introduces into the beam a phase lag which varies sinusoidally with time between plus and minus 90°. In the the case where a depth of modulation M of 90° is applied. Thus, the beam is elliptically modulated plane polarised light, the limits of modulation being circularly polarised light of opposite senses. The rhomb 38 introduces a phase lag of 90° in the 'y' component of the beam with respect to the 'x' component, and thus the resultant lag varies sinusoidally with time between 0° and −180°. Thus, the beam is elliptically polarisation modulated circularly polarised light, the limits of modulation being plane polarised light with crossed directions. Upon reflection by the distant reflector 46, a phase lag of 180° may be introduced into both the 'x' and 'y' components, but with no resultant relative phase change between the two components. When the beam returns through the rhomb 38, a further phase lag of 90° is introduced, so that the transmitted beam is elliptically polarisation modulated plane polarised light, but it will be noted that the direction of plane polarisation is at right-angles to the direction of polarisation of the outgoing beam between the crystal 20 and the rhomb 38. The crystal 20 adds to the phase lag 64 in the incident beam between the x and y directions a further phase lag which varies sinosoidally with time between plus and minus 90°. This phase lag is in phase with the phase lag introduced into the outgoing beam. However, the phasing of these two phase lags is dependent upon the distance travelled by the beam from the crystal 20 to the distant reflector 46 and back to the crystal. It will be noted that at an appropriate phasing of these two phase lags, the sum of the phase lags will be constant and produce plane polarised light, the direction of which is crossed with that of the polariser 18. Thus, none of the light passes through the polariser and a null is detected at the photo-detector 50.

The time T taken for the light to travel from the crystal 20 to the reflector 46 and back again is:

$$T = 2d/c$$

where d is the distance along the optical path from the crystal to the reflector and c is the speed of light. An appropriate phasing will be obtained between the phase lag of the returned beam entering the crystal and the phase lag caused by the crystal when:

$$T = 2d/c = (n+0.5)l/c; \text{ or}$$

$$T = 2d/c = nl/c$$

depending on the crystal type and the way in which the crystal is used, where l is the modulation wavelength and n is the number of complete wavelengths in the path from the crystal and back again. Therefore, the distance d is given by:

$$d = (0.5n + 0.25)l; \text{ or}$$

$$d = 0.5nl$$

Thus, a null is obtained at the photodetector 50 when this distance is an integral number of half-wavelengths plus a quarter wavelength, or an integral number of half-wavelengths, depending upon the crystal.

An important feature of the arrangement of FIG. 1 is that at zero modulation and at appropriate values of d, the directions of polarisation of the projected beam entering the crystal and of the returned beam leaving the crystal are crossed. Thus, a single crystal 20 and a single polariser 18 can be used.

Another important feature of the arrangement of FIG. 1 is that compensation can easily be made for stray polarising effects. If the crystal 20 has a natural birefringence which produces a lag in the 'y' component relative to the 'x' component of the beam at zero modulation, then, due to the two passages of the beam through the crystal, twice this amount of lag will be added to the lag provided by the remainder of the apparatus. Thus, when there is an integral number of half-wavelengths (plus a quarter-wavelength, depending upon the crystal) travelled by the beam from the crystal and back again (that is the case where a null will be produced in the perfect apparatus) the return beam emerging from the crystal 20 will be elliptically polarised, having a lag (or retardation) between the 'x' and 'y' components of 180° (or half a wavelength) plus twice the lag (or retardation) introduced by the natural birefringence of the crystal. Therefore, the beam will not be plane polarised light crossed with the direction of the polariser, and a perfect null will not be observed. However, by adjusting the amount of lag provided by the rhomb 38 so that rather than providing a lag of 90° between the x and y components in each pass through the rhomb 38, it provides a lag of 90° less the lag due to the natural birefringence of the crystal, the effect of the natural birefringence will be cancelled out, and a null can be observed. Similarly, strain in the optical components of the apparatus can cause a stray phase change between the x and y components of the beam, but this can be compensated for in the same way by adjusting the amount of lag provided by the rhomb 38. This amount of lag is adjusted by twisting the rhomb 38 in the direction A in FIG. 1.

Yet another advantage of the arrangement of FIG. 1 is that the crystal can be oriented such that for light travelling along the z-axis of the crystal the Pockels effect (which is a linear birefringence-voltage effect) and the Kerr effect (which is a quadratic birefringence-voltage effect) are brought into phase so that the Kerr effect does not deteriorate the quality of the null which can be obtained.

The rhomb 38 which is used need not be a perfectly designed Fresnel rhomb having a particular apex angle of approximately 50°. A rhomb may be used having an apex angle within a range, say, between 45° and 55°, provided that means are included to allow for a small accurate rotational adjustment of the rhomb in the direction A shown in FIG. 1, in order to adjust the phase lag provided by the rhomb 38.

In addition to the mounting of the rhomb 38 for rotation in the direction A, it is also mounted so that the tilt of the rhomb about the axes in the plane of the paper can be adjusted by means of three adjusting screws 112. Thus, the axes of the rhomb 38 can be adjusted with respect to the axes of the crystal.

In a modification of the arrangmeent shown in FIG. 1, the rhomb 38 is fixed, and a broad band retarding plate, for example of mica, is disposed in the light path and is rotationally and inclinationally adjustable in order to achieve a null at the photomultiplier.

In a further modification, the rhomb 38 and/or such an addition retarding plate are disposed before the crystal 20 relative to the direction of the projected beam portion. In this case, a smaller rhomb may be used. Furthermore, and importantly, the projected beam entering the crystal will be polarised substantially circularly and thus there is little or no problem in aligning the crystal axes perpendicular to the beam direction with any direction of polarisation of the beam.

Movement of the prism 42 results in an increase or decrease in length of the beam path from the crystal 20 to the reflector 46 of twice the distance by which the prism is moved. Thus, if the modulating frequency f is, for example, approximately 1.5 GHz, so that the modulation half-wavelength c/2f is exactly 100 mm, the prism 42 must be moveable over a distance of at least approximately 50 mm in order to be able to obtain a null.

Figure 2A:
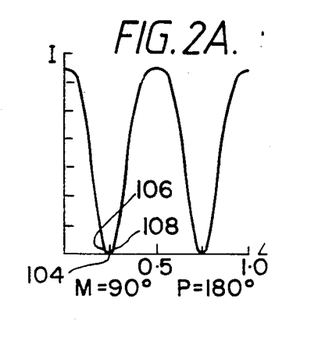
FIGS. 2A to 2F illustrate the output of a photodetector of the apparatus of FIG. 1 in different circumstances as the length of the optical path of the light beam is varied through one modulation wavelength.

FIG. 2A shows how the output I from the photomultiplier 50 varies as the reflector 46 is displaced through one modulation wavelength, in the case where the depth of modulation M provided by the crystal is 90°, and the total constant phase shift P provided by the apparatus is 180°. It will be noted that nulls are obtained at a quarter wavelength and three quarters of a wavelength and that the photodetector output I exhibits very steep gradients to either side of the null.

Figure 2B:
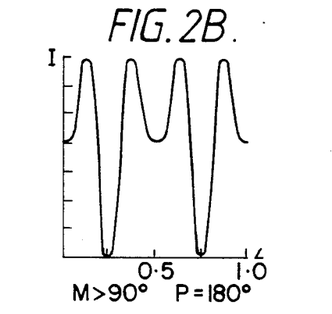

FIG. 2B shows the case in which the depth of modulation M is greater than 90°. It will be noted that even steeper gradients of the photomultiplier output I occur to either side of each null. The depth of modulation should not be increased too greatly above 90°, otherwise further more rounded nulls will occur at the zero and one half-wavelength points, or symmetrically about these points.

Figure 2C:
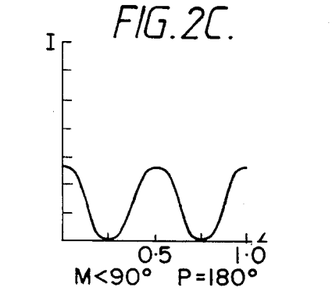

FIG. 2C shows the case in which the depth of modulation M is less than 90°. It will be noted that the curve is more rounded adjacent to each null, and so the sensitivity of the apparatus is decreased with this lesser depth of modulation.

Figure 2D:
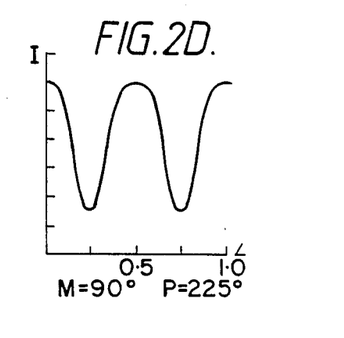

FIG. 2D corresponds to FIG. 2A, with the exception that the constant phase lag provided by the system is not adjusted to 180°, but rather an additional shift of 45° is introduced so that the total constant phase shift is 225°. It will be seen that a perfect null cannot be obtained.

Figure 2E:
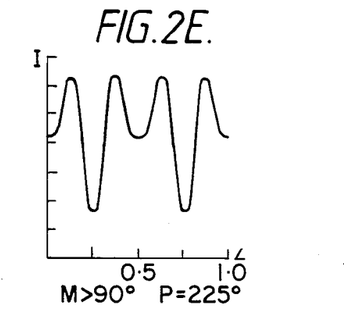
Figure 2F:
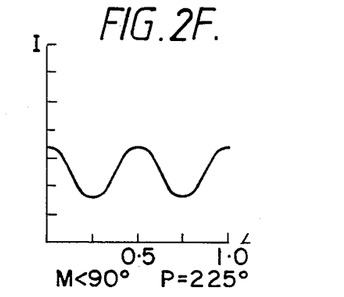

FIGS. 2E and 2F correspond to FIGS. 2B and 2C respectively, but showing the case where, similarly to FIG. 2D, the total constant phase shift provided by the system is 225°, rather than 180°.

The basic steps in performing a distance measurement will now be described. Firstly the reflector 46 is placed with its reference surface 70 flat against the reference surface 68 on the main unit 8. The variable light path is then adjusted to produce a null at the photo-detector 50.

The datum position of the variable light path can then be set to zero, or a datum reading can be taken. If the reflector is then moved to a remote position and the variable light path is adjusted to produce a null by moving the prism 42 to the right (as viewed in FIG. 1), the difference between the adjusted position and the datum position on the vernier 44 will be one half of the distance between the reference surfaces 68, 70 in excess of an integral number of modulation half-wavelengths. For most mechanical engineering measurements, the required distance will be known roughly, and it is then possible, using the variable light path, to measure the distance more accurately. If it is thought that the approximate distance between the reference surfaces 68, 70 is 28.85 m, and the movement of the prism 42 to the right (viewed in FIG. 1) from the datum position to obtain a null is 36.745 mm, then the decrease in the length of the variable light path is $2 \times 36.745 = 73.49$ mm, and so it is evident that, in the case where the modulation half wavelength is 100 mm, the accurate distance is 28.87349 m.

The manner of driving the arrangement of FIG. 1 will now be described. A pulse generator 10 provides the following outputs:

(a) a high voltage pulse (for example 1000V) of duration 30 microseconds and repetition time 10 milliseconds to the anode of a ceramic triode valve 24 of grounded-grid type inserted across the modulating resonator 22;

(b) a trigger pulse to the flash tube 12 timed about 12 microseconds after each pulse to the triode valve 24 so that when the flash tube 12 is triggered a high steady power level has been reached in the modulating resonator 22. The flash produced by the tube has a duration of about 3 microseconds;

(c) a 50 Hz synchronous square-wave signal via a capacitor 80 to (i) the electromagnet 32 for the prism 28 so that when the flash tube 12 is triggered the prism 28 is alternately at one end and the other end of its range of movement, and/or (ii) a varactor 82 (variable capacity diode) mounted in the modulating resonator 22;

(d) a 50 Hz square-wave reference signal to a synchronous detector unit 78; and (e) a 100 Hz square-wave gating signal to gate-off one or more of the dynodes of the photomultiplier 50 when not receiving light.

The pulse applied to the triode valve 24 causes the modulating resonator 22 to resonate at a microwave frequency of approximately 1.5 GHz. The modulating resonator 22 is tuned with reference to the reference cavity 72 initially by a tuning screw 73. The reference cavity has a resonant frequency of 4.5 GHz and a Q-valve of between 4000 and 5000. A coupling loop 75 in the base of the modulating resonator 22 is connected via coaxial cable to a zero-biased microwave diode 74 mounted in the reference resonator 72. A forward-biased microwave diode 76 mounted in the reference resonator 72 is connected via coaxial cable to the synchronous detector unit 78. One of the functions of the synchronous detector unit 78 is to detect and display on a centre-zero metoer 84 tuning of the modulating resonator 22 with reference to the reference resonator 72. The tuning screw 73 is adjusted until the meter 84 is centred, indicating that the modulating resonator 22 is tuned so that the reference resonator 72 is resonating as the third harmonic of the modulating resonator, that is to say the modulating resonator 22 is resonating at exactly 1.5 GHz.

In order to resolve the frequency of the reference resonator, the frequency of the modulating resonator is 'wobbled' or oscillated by approximately 1 part in 5000 by a reactive plunger 102 projecting from the spring 30 through an aperture in the modulating resonator 22 and vibrating at 50 Hz and/or by the varactor 82 which is driven by the same signal as the electromagnet 32. This 1 in 5000 frequency change causes the modulating frequency to jump every pulse from one shoulder to the other of the resonance curve of the reference resonator. Thus, the frequency of the modulating resonator can be set more accurately, for example to an accuracy of the order of one part in one million, than can be achieved by tuning the modulating resonator frequency to the peak of the resonance curve of the reference resonator.

Once the modulating resonator 22 has been tuned, it is phase locked with the reference resonator 72 upon manual operation of a selector switch 86 by means of a varactor 100 mounted in the modulating cavity. The phase lock can be kept perfect by applying a DC bias to the electromagnet 32 or to the varactor 82, the capacitor 80 acting to block DC feed back to the pulse generator 10. Variations in the distance being measured (for example thermal changes) can be then monitored by an error meter 110 in the phase-lock loop to the electromagnet 32 or varactor 82.

After the frequency of the modulating resonator 22 has been set, the detector unit 78 is manually set by the selector switch 86 to display the strength of the photomultiplier output on a meter 96, and alignment of the main unit 8 and the reflector 46 can then be adjusted to obtain the maximum reading on the meter 96. The detector unit 78 incorporates a gain control 98 and also supplies an automatic gain control (AGC) signal to the photomultiplier. The gain control can thus be set to a convenient level. The action of the AGC is to bring up the pulses of light seen by the photomultiplier to an average constant level so that the smaller the deviation from a light minimum, the greater the sensitivity of the apparatus.

In order to resolve a null at the photomultiplier 50, the length of the light path is 'wobbled' or oscillated by the oscillating prism 28. Thus, referring to FIG. 3A, rather than detecting a null 104, intensities 106, 108 on either side of the null are detected, the synchronous detector unit 78 is operable to detect equality of the intensities. At full photomultiplier gain, this gives rise to a sensitivity of the apparatus of 0.01 mm.

The wobbling of the light path by the prism 28 and the wobbling of the modulating frequency by the reactive plunger or by the varactor 82 augment each other, and it is possible that only wobbling of the modulating frequency need be provided, for example by the varactor 82 in order to resolve both the reference frequency and the photomultiplier null.

Figure 3:
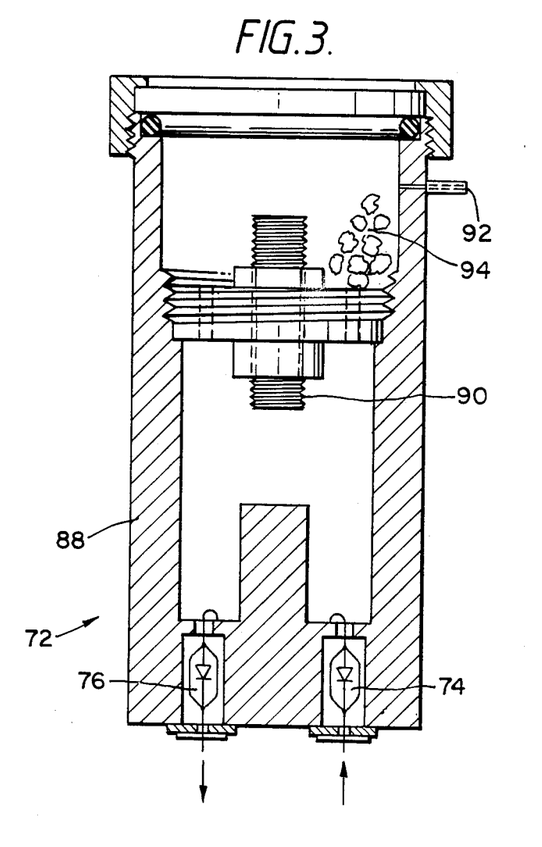
FIG. 3 illustrates a reference resonator used in the apparatus of FIG. 1.

There now follows a description of the reference resonator 22 with reference to FIG. 3.

The resonator 22 has a generally cylindrical body 88 providing a quarter-wavelength resonant cavity. The internal surface of the resonator is plated with copper or silver. A screw-threaded metal plunger 90 is mounted in the cylindrical body and is axially movable to adjust the resonant frequency. The inside of the resonator is vented to the atmosphere by a very fine hole 92 and silica gel granules 94 are disposed in the resonator. The air in the resonator is thus kept dry and at ambient temperature and pressure which therefore provides a good measure of compensation for atmospheric refractivity changes. The body 88 of the resonator may be constructed of a material of low coefficient of thermal expansion, such as quartz or 'invar' (36% nickel-steel,) so that it is not substantially affected by temperature changes. Alternatively, if a measurement is desired to be made of a structure of known material, the body of the resonator may be constructed of the same material as the structure or of a material having a similar coefficient of thermal expansion. In this latter case, the resonant frequency of the resonator may be calibrated at a particular reference temperature, such as 20° C., and the resonator may be mounted on the structure to be measured. Due to the change in resonant frequency with temperature, the apparatus will provide measurements of the structure converted to the reference temperature, rather than actual measurements at the actual temperature.

Figure 4:
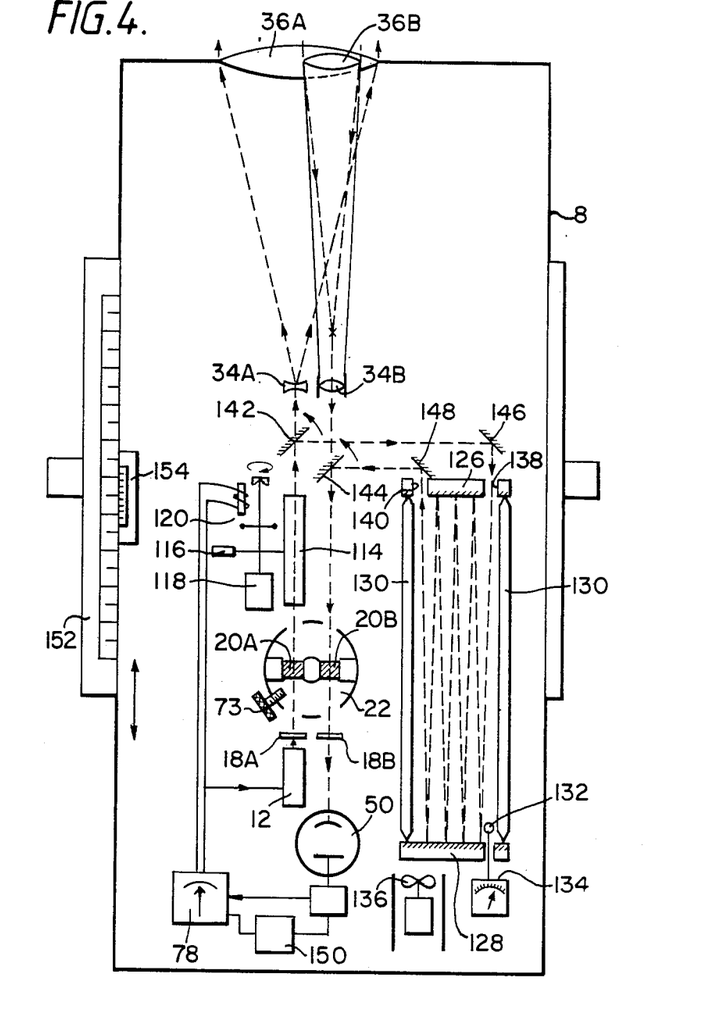
FIG. 4 illustrates diagrammatically another embodiment of metrological apparatus according to certain of the aspects of the invention.

There now follows a description, with reference to FIG. 4, of a further embodiment of certain aspects of the invention. In FIG. 4, elements similar to those shown in FIG. 1 have been designated by the same reference numeral.

Whereas the arrangement of FIG. 1 is a coaxial system, that is to say the projected and returned beam portions travel along the same path, the arrangement of FIG. 4 is a quasi-coaxial system in which the projected and returned beam portions are closely parallel to each other.

Rather than using a single crystal, two crystals 20A, 20B are disposed in the projected and returned beam portions respectively. The crystals may be arranged so that the Z-axes of the crystal structures are parallel to the light beam and so that the X-axes of the crystal structures are orthogonal to each other. If the dimensions of the crystals 20A, 20B in the beam direction are equal to within a few wavelengths of light, then this arrangement of the crystal axes will compensate for the natural birefringence of the crystals. In order to provide trimming to cancel out any difference between the natural birefringence of the crystals 20A, 20B, a broad band retarding plate, capable of rotation or tilting adjustments, may be inserted in the optical path of the polarised beam. In the case where white light is used, such a retarding plate may be of mica.

Two polarising filters 18A, 18B are disposed in the projected and returned beam portions, respectively. The directions of the polarising filters are crossed with each other.

In order to provide 'wobbling' of the effective length of the light path so that a null at the photomultiplier 50 can be resolved, a rotating alternating light path arrangement is provided. A glass block 114 and a relatively shorter glass block 116 are mounted on arms projecting radially oppositely from a shaft driven by a motor 118. A shaft position detector 120 is provided, and the motor is driven in synchronism with the flashes from the flash tube 12 so that for alternate flashes the long block 114 and the short block 116 are disposed in the projected portion of the light beam. The light takes longer to pass through the long block 114 than the short block 116, and therefore the effect is to wobble the time taken for the light to pass through the apparatus.

The arrangement of FIG. 4 employs an optical resonator 124, rather than a microwave resonator as a wavelength standard. The optical resonator 124 is a multiple reflection system comprising a pair of reflector units 126, 128 spaced apart by rods 130 of a thermally-stable material, or of any convenient material depending upon the coefficient of expansion desired. A temperature sensor 132 is provided, and the temperature of the optical resonator is displayed on a meter 134, so that any appropriate temperature correction can be calculated. A fan 136 is provided to assist the optical resonator in attaining, as far as possible, the ambient temperature.

The optical resonator has an inlet opening 138 and an outlet opening 140. In order to tune the modulating cavity, movable mirrors 142,144 in the projected and returned beam portions are moved to the positions shown in FIG. 4 so that the projected beam is directed via the movable mirror 142 and a further mirror 146 to the inlet 138 of the optical resonator 124, and the beam from the outlet 140 is directed via a mirror 148 and the movable mirror 144 back to the modulating resonator 22. The total optical path length thus provided is 10 m, and this enables a sensitivity of up to 1 part in 1 million to be approached. The tuning screw 73 is adjusted until the synchronous detector unit 78 indicates that a phase lock unit 150 has locked the modulating half-wavelength to 100 mm. As with the arrangement of FIG. 1, in order to resolve the modulating frequency, the frequency is 'wobbled' by a varactor similar to varactor 82 in FIG. 1 or by a movable reactive element similar to the oscillating reactive plunger 102 in FIG. 1. Once the modulating resonator 22 has been tuned, the movable mirrors 142, 144 are rotated so that the projected beam can be transmitted to the target reflector, and the returned beam is returned to the modulating resonator.

In the arrangement of FIG. 4, rather than providing a variable light path as used in FIG. 1, the whole of the main unit 8 is slidable relative to a scale 152, and a vernier scale 154 is provided.

In a modification of the arrangement of FIG. 4, by minor rearrangement of the reflectors 142, 144, the optical resonator may be incorporated as a permanent part of the transmitted light path. In this case, the main unit 8 may be calibrated by bringing the target-reflector into contact with the front of the main unit 8, and the reflectors 146, 148 may be given a small lateral adjustment to ensure that, when a phase lock is attained, the modulation half-wavelength is precisely 100 mm. The advantage of this modification is that if the path length within the optical resonator is, say, 10 m and the frequency change between alternate pulses of the modulator 'wobble' is, say, 1 in 5000, then adequate sensitivity can be attained without the use of the mechanical distance alternator employing the glass blocks 114, 116.

The alternating optical path provided by the arrangement including the glass blocks 114, 116 may be incorporated in the arrangement of FIG. 1, rather than using the oscillating prism 28. Furthermore, the optical resonator described with reference to FIG. 4 may also be used in the arrangement of FIG. 1, rather than the microwave cavity resonator 72.

Whilst various embodiments and modifications have been described above of the different aspects of the invention, it will be appreciated that other modifications and developments may be made within the scope of the invention.

What is claimed is:

1. Metrological apparatus comprising:
   means for projecting a beam of polarised radiation having components in first and second orthogonal directions such that the beam can be returned back along substantially the same path;
   means for modulating a phase difference between said components in the projected portion of the beam and in the returned portion of the beam;
   means for detecting the returned portion of the beam after modulation; and
   phase shift means for introducing an adjustable unmodulated relative phase shift between the components of the beam.

2. An apparatus as claimed in claim 1, wherein the detecting means comprises a polarisation filter for filtering the returned portion of the beam and null detector means for detecting when substantially none of the returned portion of the beam passes through the polarisation filter.

3. An apparatus as claimed in claim 2 wherein the projected portion of the beam is polarised by the polarisation filter.

4. An apparatus as claimed in claim 1, wherein the modulating means comprises an electro-optical crystal arranged to modulate both the projected portion and the returned portion of the beam.

5. Metrological apparatus comprising:
   means for projecting a beam of polarised radiation having components in first and second orthogonal directions such that the beam can be returned back along substantially the same path;
   means for modulating a phase difference between said components in the projected portion of the beam and in the returned portion of the beam;
   means for detecting the returned portion of the beam after modulation; and
   phase shift means for introducing an adjustable unmodulated relative phase shift between the components of the beam, said phase shift means comprising a rhomb and means to adjust the rhomb about an axis perpendiculur to the plane of the rhomb.

6. An apparatus as claimed in claim 5, characterised by means to adjust tilting of the rhomb about at least one axis in the plane of the rhomb.

7. Metrological apparatus comprising:
   means for projecting a beam of polarised radiation having components in first and second orthogonal directions such that the beam can be returned back along substantially the same path;
   mean for modulating a phase difference between said components in the projected of the beam and in the returned portion of the beam;
   means for detecting the returned portion of the beam after modulation; and
   phase shift means for introducing an adjustable unmodulated relative phase shift between the components of the beam, said phase shift means comprising a retardation plate and means to adjust the plate about an axis perpendicular to the plane of the plate.

8. A metrological method comprising the steps of:
   projecting a beam of polarised radiation having components in first and second orthogonal directions;
   returning the polarised beam along substantially the same path;
   modulating a phase difference between said components in the projected portion of the beam and in the returned portion of the beam;
   detecting the returned portion of the beam after modulating; and
   introducing an adjustable unmodulated relative phase shift between the components of the beam.

9. A method as claimed in claim 8, wherein the detecting step comprises the steps of polarisation filtering the returned portion of the beam and detecting when substantially none of the returned portion of the beam is passed in the polarisation filtering step.

10. A method as claimed in claim 9, wherein a polarisation filter is used for polarising the projected portion of the beam, and the same polarisation filter is used for filtering the returned portion of the beam.

11. A method as claimed in claim 8, wherein a single electro-optical crystal is used to modulate both the projected portion and the returned portion of the beam.

12. A metrological apparatus comprising:
means for projecting a beam of radiation such that the beam can be returned to the apparatus;
means for varying the length of the path travelled by the beam;
means for detecting a characteristic of the returned portion of the beam which varies with the length of the path travelled by the beam; and
means for determining when the rate of change of the detected characteristic with respect to the length of the path is substantially zero;
characterised in that:
means are provided for introducing an alternating variation into the beam;
the determining means comprises means for determining when the detected characteristic is substantially equal for the alternate variations; and
the alternating variation means comprises means for alternating the length of the path travelled by the beam.

13. An apparatus according to claim 12, characterised in that the path length alternating means comprises an element disposed in the beam path and means for vibrating the element.

14. A metrological apparatus comprising:
means for projecting a beam of radiation such that the beam can be returned to the apparatus;
means for varying the length of the path travelled by the beam;
means for detecting a characteristic of the returned portion of the beam which varies with the length of the path travelled by the beam; and
means for determining when the rate of change of the detected characteristic with respect to the length of the path is substantially zero;
characterised in that:
means are provided for introducing an alternating variation into the beam; and
the determining means comprises means for determining when the detected characteristic is substantially equal for the alternate variations; and
the alternating variation means comprises means for alternating the time taken for the beam to travel along the path.

15. An apparatus according to claim 14, characterised in that the time alternating means comprises an element which reduces the velocity of the beam and means for alternately disposing in and removing from the beam path the element.

16. A metrological method comprising the steps of:
projecting a beam of radiation;
returning the beam of radiation;
varying the length of the path travelled by the beam;
detecting a characteristic of the returned portion of the beam which varies with the length of the path travelled by the beam; and
determining when the rate of change of the detected characteristic with respect to the length of the path is substantially zero;
characterised by the steps of;
introducing an alternating variation into the beam; and
determining said zero rate of change by determining when the detected characteristic is equal for the alternate variations;
said alternating variation being an alternating variation in the length of the path travelled by the beam.

17. A method as claimed in claim 16, characterised by vibrating an element in order to provide the alternating variation of path length.

18. A metrological method comprising the steps of:
projecting a beam of radiation;
returning the beam of radiation;
varying the length of the path travelled by the beam;
detecting a characteristic of the returned portion of the beam which varies with the length of the path travelled by the beam; and
determining when the rate of change of the detected characteristic with respect to the length of the path is substantially zero;
characterised by the steps of;
introducing an alternating variation into the beam; and
determining said zero rate of change by determining when the detected characteristic is equal for the alternate variations;
said alternating variation being an alternating variation in the time taken for the beam to travel along the path.

19. A method as claimed in claim 18, characterised by alternately disposing in and removing from the beam path an element which reduces the velocity of the beam.

20. A metrological method comprising the steps of: projecting a beam of radiation from a first portion of a structure to a second portion of the structure; modulating the beam at a modulation wavelength defined with respect to a reference wavelength; detecting the beam after it has reached the second portion of the structure; and determining the distance between the first and second portions using the result of the detection step; characterised by the steps of: defining the reference wavelength by a means having a coefficient of thermal expansion substantially equal to that of the structure; and adjusting the temperature of the wavelength defining means to be substantially equal to that of the structure.

21. A method as claimed in claim 20, characterised in that the wavelength defining means is placed in contact with the structure.

* * * * *

UNITED STATES PATENT AND TRADEMARK OFFICE
CERTIFICATE OF CORRECTION

PATENT NO. : 4,786,176

DATED : November 22, 1988

INVENTOR(S) : Froome

It is certified that error appears in the above-identified patent and that said Letters Patent is hereby corrected as shown below:

Column 2, line 67, "dithium" should read --lithium--.

Column 8, line 61, "metoer" should read --meter--.
Column 12, line 46, "mean" should read --means--.
Column 12, line 47, after "projected" insert --portion--.

Signed and Sealed this

Twentieth Day of June, 1989

Attest:

DONALD J. QUIGG

Attesting Officer

Commissioner of Patents and Trademarks